(12) United States Patent
Goto et al.

(10) Patent No.: US 8,717,921 B2
(45) Date of Patent: May 6, 2014

(54) RECEIVING APPARATUS

(75) Inventors: Yoshikazu Goto, Yokohama (JP);
Akihito Hanaki, Yokohama (JP);
Yukiko Takagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 167 days.

(21) Appl. No.: 13/259,608

(22) PCT Filed: Mar. 16, 2010

(86) PCT No.: PCT/JP2010/054448
§ 371 (c)(1),
(2), (4) Date: Sep. 23, 2011

(87) PCT Pub. No.: WO2010/110128
PCT Pub. Date: Sep. 30, 2010

(65) Prior Publication Data
US 2012/0039206 A1    Feb. 16, 2012

(30) Foreign Application Priority Data
Mar. 23, 2009   (JP) ................. 2009-070565

(51) Int. Cl.
*H04L 12/26*   (2006.01)
(52) U.S. Cl.
USPC ................... 370/252; 370/229; 370/311
(58) Field of Classification Search
USPC ......... 370/229, 230, 231, 232, 235, 236, 252, 370/253, 311, 318
See application file for complete search history.

(56) References Cited

U.S. PATENT DOCUMENTS

| | | | |
|---|---|---|---|
| 7,002,923 B2 * | 2/2006 | Golitschek et al. | 370/253 |
| 8,126,497 B1 * | 2/2012 | Vargantwar et al. | 455/522 |
| 2006/0270435 A1 * | 11/2006 | Chemiakina et al. | 455/522 |
| 2007/0015528 A1 * | 1/2007 | Nemethova et al. | 455/522 |
| 2007/0298822 A1 * | 12/2007 | Wan et al. | 455/509 |
| 2008/0195899 A1 * | 8/2008 | Park et al. | 714/708 |
| 2008/0214227 A1 * | 9/2008 | Usuda et al. | 455/522 |
| 2008/0316934 A1 * | 12/2008 | Nibe | 370/252 |
| 2009/0052322 A1 * | 2/2009 | Simonsson et al. | 370/235 |
| 2009/0201870 A1 | 8/2009 | Goto et al. | |
| 2010/0091669 A1 | 4/2010 | Liu et al. | |
| 2010/0166010 A1 | 7/2010 | Ukita et al. | |
| 2010/0197337 A1 * | 8/2010 | Larsson et al. | 455/522 |
| 2011/0007790 A1 * | 1/2011 | Xu et al. | 375/225 |

FOREIGN PATENT DOCUMENTS

| | | |
|---|---|---|
| JP | 2006 140650 | 6/2006 |
| JP | 2009 188955 | 8/2009 |
| WO | 2008 105771 | 9/2008 |
| WO | 2009 001552 | 12/2008 |

OTHER PUBLICATIONS

International Search Report Issued Jun. 8, 2010 in PCT/JP10/054448 Filed Mar. 16, 2010.

* cited by examiner

*Primary Examiner* — Kwang B Yao
*Assistant Examiner* — Nguyen Ngo
(74) *Attorney, Agent, or Firm* — Oblon, Spivak, McClelland, Maier & Neustadt, L.L.P.

(57) ABSTRACT

A receiving apparatus (10) provided with: a management unit (13) configured to manage a target error rate Pt in a target number of retransmission Nt; a measurement unit (14) configured to measure the initial transmission rate $TPUT_{init}$ of the data at a transmitting apparatus (10); and a calculation unit (15) configured to calculate, with respect to an error rate P(n) in a number of retransmission n, the reception rate TPU of data at a receiving apparatus (10) by a Equation (2A).

$$TPUT = \frac{TPUT_{init}}{Nt + Pt + 1}. \qquad \text{[Equation 2A]}$$

7 Claims, 2 Drawing Sheets

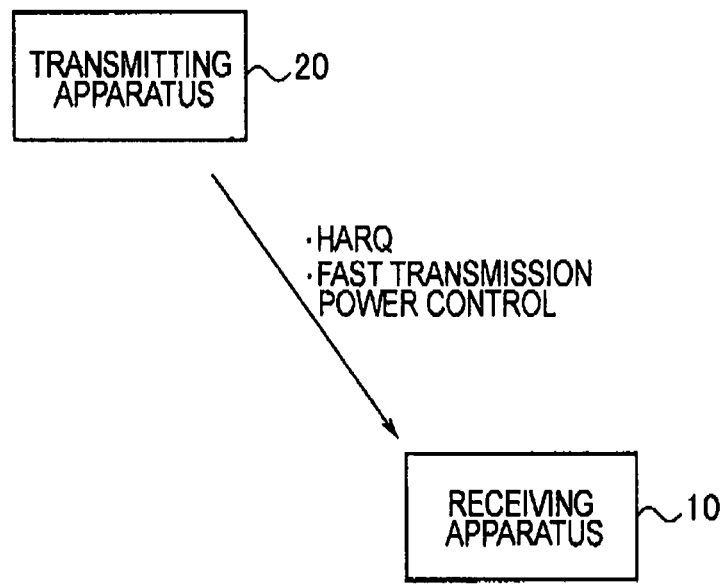
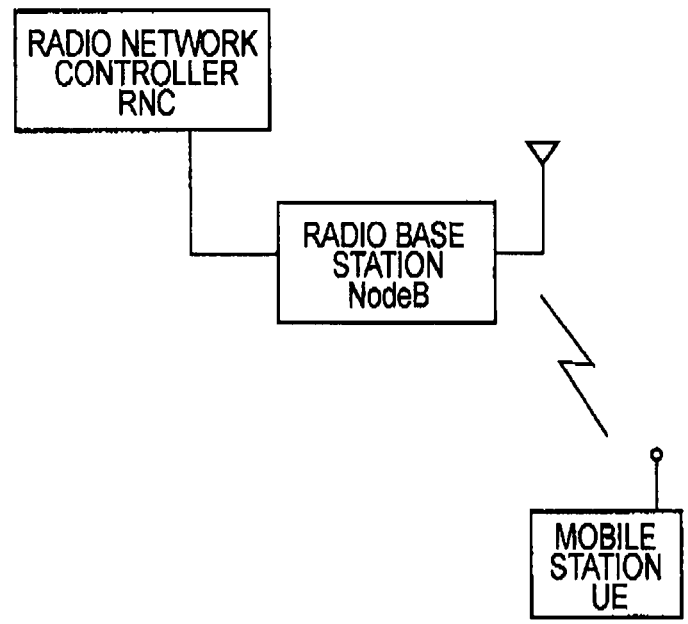

(a)

| Nt | Pt |
|---|---|
| 0 | 0.3 |

(b)

| Nt | Pt |
|---|---|
| 1 | 0.3 | ns
RECEIVING APPARATUS

TECHNICAL FIELD

The present invention relates to a receiving apparatus configured to receive data transmitted from a transmitting apparatus by using retransmission control of an HARQ (Hybrid Automatic Repeat Request) scheme.

BACKGROUND ART

In an EUL (Enhanced Uplink) scheme, fast transmission power control is applied.

In general, "Inner-loop Transmission Power Control" and "Outer-loop Transmission Power Control" are performed in parallel in the aforementioned fast transmission power control. The "Inner-loop Transmission Power Control" controls a transmission power so as to meet a target SIR (Signal to Interference Ratio). The "Outer-loop Transmission Power Control" controls the target SIR so as to meet a target BLER (Block Error Rate).

In addition, in a mobile communication system in which the aforementioned fast transmission power control and retransmission control of a HARQ scheme are performed in combination as in the case of the EUL scheme, the BLER in each number of retransmissions varies to a large extent even for the same reception SIR with focus on a specific HARQ process. For this reason, a technique has been proposed which controls a target number of retransmissions and a target BLER so as to meet the target BLER in the target number of retransmissions.

PRIOR ART DOCUMENT

Patent Document

Patent Document 1; Japanese Patent Application No. 2008.029727

SUMMARY OF THE INVENTION

Problem to be Solved by the Invention

In the aforementioned mobile communication system, however, a target value of a reception rate (throughput) of data cannot be calculated in consideration of data which is successfully received in the target number of retransmissions and thereafter, when the target number of retransmissions and the target BLER are set in a radio bass station NodeB or a radio network controller RNC which is the receiving apparatus. Thus, there arises a problem that the target value of the reception rate differs from the actual reception rate.

In this respect, the present invention has been made in view of the aforementioned problem, and an objective of the present invention is to provide a receiving apparatus capable of appropriately calculating a target value of a reception rate of data in a mobile communication system in which fast transmission power control and retransmission control of an HARQ scheme are performed in combination.

Means for Solving the Problem

A first feature of the present invention is summarized as a receiving apparatus configured to receive data transmitted from a transmitting apparatus by using retransmission control of a hybrid automatic repeat request scheme, the receiving apparatus including: a management unit configured to manage a target error rate Pt in a target number of retransmissions Nt; a measurement unit configured to measure an initial transmission rate $TPUT_{init}$ of the data in the transmitting apparatus; and a calculation unit configured to calculate a target value TPUT of a reception rate of the data in the receiving apparatus by Equation 1, $$TPUT = \frac{TPUT_{init}}{Nt + Pt + 1}. \quad \text{[Equation 1]}$$

Effect of the Invention

As described above, the present invention makes it possible to provide a receiving apparatus capable of appropriately calculating a target value of a reception rate of data in a mobile communication system in which fast transmission power control and retransmission control of a HARQ scheme are performed in combination.

BRIEF DESCRIPTION OF DRAWINGS

FIG. 1 is an overall configuration diagram of a mobile communication system according to a first embodiment of the present invention.

FIG. 2 is a diagram showing an example of the mobile communication system according to the first embodiment of the present invention.

MODE FOR CARRYING OUT THE INVENTION

Figures 3, 4:
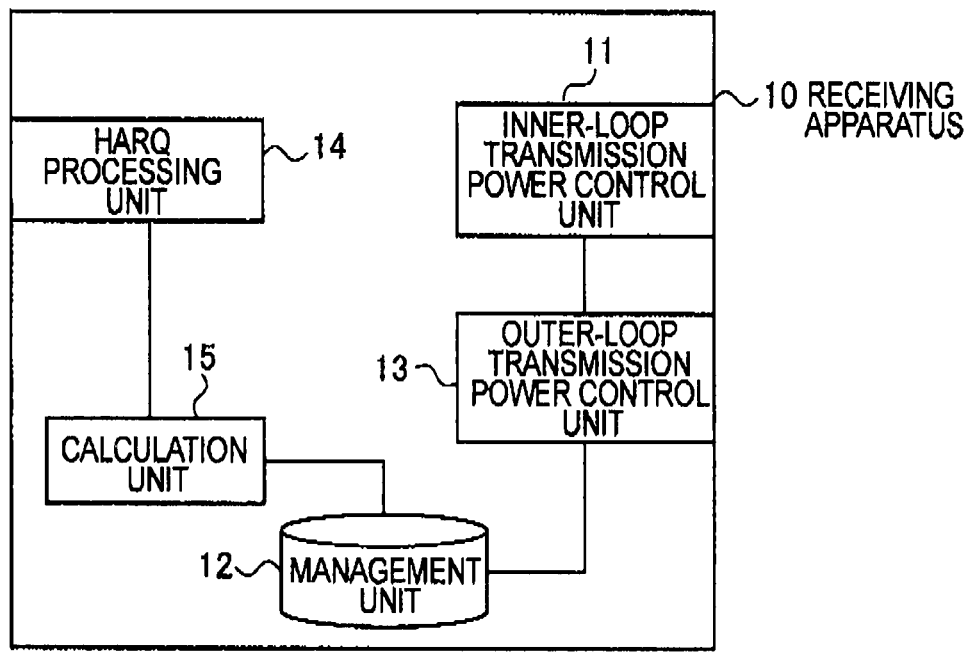
FIG. 3 is a functional block diagram of a receiving apparatus according to the first embodiment of the present invention.
FIG. 4 is a diagram showing examples of values managed in a management unit of the receiving apparatus according to the first embodiment of the present invention.

Mobile Communication System According to First Embodiment of the Present Invention A mobile communication system according to a first embodiment of the present invention will be described with reference to FIG. 1 through FIG. 4.

As shown in FIG. 1, fast transmission power control and retransmission control of an HARQ scheme are applied to communications between a transmitting apparatus 20 and a receiving apparatus 10 in the mobile communication system according to the present embodiment.

In a case where the mobile communication system according to the present embodiment includes a radio network controller RNC, a radio base station NodeB and a mobile station UE, for example, the transmitting apparatus 20 may be provided in the radio base station NodeB or the mobile station UE.

Here, in a case where the transmitting apparatus 20 is provided in the mobile station UE, the receiving apparatus 10 may be provided in the radio base station NodeB.

In addition, in a case where the transmitting apparatus 20 is provided in the mobile station UE, the receiving apparatus 10 may be provided in the radio network controller RNC.

Furthermore, in a case where the transmitting apparatus 20 is provided in the radio base station NodeB, the receiving apparatus 10 may be provided in the mobile station UE.

Hereinafter, a description will be given using the mobile communication system employing the EUL scheme, in which the transmitting apparatus 20 is provided in the mobile station UE and the receiving apparatus 10 is provided in the radio base station NodeB, as an example for convenience of the description.

As shown in FIG. 3, the receiving apparatus 10 includes an inner-loop transmission power control unit 11, a management unit 12, an outer-loop transmission power control unit 13, an HARQ processing unit 14 and a calculation unit 15.

The inner-loop transmission power control unit 11 is configured to control a transmission power of the mobile station UE (transmitting apparatus 20) on the basis of a target SIR (target reception quality).

The inner-loop transmission power control unit 11 is configured to measure a reception SIR of a signal transmitted by the mobile station UE and then to transmit, to the mobile station UE, a TPC command for increasing or decreasing the transmission power in the mobile station UE in such a way that the reception SIR becomes close to the target SIR, for example.

The management unit 12 is configured to manage a target BLER (target error rate) Pt in a target number of retransmissions Nt. Parts (a) and (b) of FIG. 4 show Examples of the target BLER (target error rate) Pt in the target number of retransmissions Nt managed by the management unit 12.

The outer-loop transmission power control unit 13 is configured to control the target SIR on the basis of the target error rate Pt in the target number of retransmissions Nt managed by the management unit 12.

The HARQ processing unit 14 is configured to receive a MAC-e PDU transmitted from the transmitting apparatus 20 by using retransmission control of the HARQ scheme.

To put it more specifically, the HARQ processing unit 14 is configured to reply to the mobile station UE with ACK when succeeding in receiving a MAC-e PDU in each HARQ process, and also to reply to the mobile station UE with NACK when failing in receiving a MAC-e PDU in each HARQ process.

Here, the HARQ processing unit 14 is configured to measure an initial transmission rate $TPUT_{init}$ of the MAC-e PDU in the mobile station UE on the basis of the number of bits included in the MAC-e PDU in each HARQ process.

Note that, a TTI allocated to each HARQ process in the EUL scheme is 2 ms or 10 ms.

The calculation unit 15 is configured to calculate a target value TPUT (throughput) of the reception rate of a MAC-e PDU in the radio base station NodeB (receiving apparatus 10) by Equation 2.

$$TPUT = \frac{TPUT_{init}}{Nt + Pt + 1} \quad \text{[Equation 2]}$$

Hereinafter, a description will be given of the reason why the target value TPUT (throughput) of the reception rate of a MAC-e PDU in the radio base station NodeB (receiving apparatus 10) can be calculated in the aforementioned manner.

In a case where fast transmission power control and retransmission control of the HARQ scheme are used in combination, the error rate P(n) in the number of retransmissions n becomes equal to each value in Equation 3.

$$\begin{cases} P(n) = 1 & (\text{if, } 0 \le n < Nt) \\ P(n) = Pt & (\text{if, } n = Nt) \\ P(n) = 0 & (\text{if, } Nt < n) \end{cases} \quad \text{[Equation 3]}$$

As shown in Part (a) of FIG. 4, in a case where the mobile station UE transmits ten MAC-e PDUs for ten seconds when "Nt=0" and "Pt=0.3" are set in the management unit 12, for example, the HARQ processing unit 14 succeeds in receiving seven MAC-e PDUs out of the initially transmitted ten MAC-e PDUs and thus replies with ACK while failing in receiving three MAC-e PDUs and thus replying with NACK.

Next, the HARQ processing unit 14 succeeds in receiving all of three MAC-e PDUs retransmitted for the first time and thus replies with ACK.

Here, an assumption is made that when failing in receiving MAC-e PDUs retransmitted for the Nt-th time (0-th time, i.e., the initial transmission in the example in Part (a) of FIG. 4), the HARQ processing unit 14 succeeds in receiving all the MAC-e PDUs when the MAC-e PDUs are retransmitted for (Nt+1)-th time (first time in the example in Part (a) of FIG. 4).

In this case, the actual reception rate of the MAC-e PDUs in the radio base station NodeB becomes equal to "$TPUT_{init} \times 10/13$" because "(number of MAC-e PDUs for which ACK is replied)/(total number of transmitted MAC-e PDUs)."

Meanwhile, the target value TPUT of the reception rate of the MAC-e PDUs in the radio base station NodeB, which is derived by the calculation unit 15, also becomes equal to "$TPUT_{init}/(Nt+Pt+1)(=TPUT_{init}/(0+0.3+1)=TPUT_{init} \times 10/13)$." Thus, the target value of the reception rate becomes equal to the actual reception rate.

Likewise, as shown in Part (b) of FIG. 4, in a case where the mobile station UE transmits ten MAC-e PDUs for ten seconds when "Nt=1" and "Pt=0.3" are set in the management unit 12, the HARQ processing unit 14 fails in receiving all the initially transmitted ten MAC-e PDUs and thus replies with NACK.

Next, the HARQ processing unit 14 succeeds in receiving seven MAC-e PDUs out of ten MAC-e PDUs retransmitted for the first time and thus replies with ACK while failing in receiving three MAC-e PDUs and thus replies with NACK.

Thereafter, the HARQ processing unit 14 succeeds in receiving all the three MAC-e PDUs retransmitted for the second time and thus replies with ACK.

Here, an assumption is made that when failing in receiving MAC-e PDUs retransmitted for the Nt-th time (the first time in the example in Part (b) of FIG. 4), the HARQ processing unit 14 succeeds in receiving all the MAC-e PDUs when the MAC-e PDUs are retransmitted for the (Nt+1)-th time (the second time in the example in Part (b) of FIG. 4).

In this case, the actual reception rate of the MAC-e PDUs in the radio base station NodeB becomes equal to "$TPUT_{init} \times 10/23$" because of "(number of MAC-e PDUs for which ACK is replied)/(total number of transmitted MAC-e PDUs)."

Meanwhile, the target value TPUT of the reception rate of the MAC-e PDUs in the radio base station NodeB, which is derived by the calculation unit 15, also becomes equal to "$TPUT_{init}/(Nt+Pt+1)(=TPUT_{init}/(1+0.3+=TPUT_{init} \times 10/23)$." Thus, the target value of the reception rate becomes equal to the actual reception rate.

Note that, it has been revealed from a result of a simulation that reception of an MAC-e PDU at the initial transmission fails in the radio base station NodeB with a probability of almost 100% when the target BLER (target error rate) Pt in each number of retransmissions is set to approximately 10%.

Operational Effect of Mobile Communication System According to First Embodiment of the Present Invention With the mobile communication system according to the first embodiment of the present invention, the receiving apparatus 10 (e.g., radio base station NodeB) is capable of calculating a target value of a reception rate (throughput) of data while taking into consideration the data (e.g., MAC-e PDU) which is successfully received in the target number of retransmissions Nt and thereafter.

An aspect of the present embodiment described above may be expressed in the following manner.

A first aspect of the present embodiment is summarized as the receiving apparatus 10 configured to receive data transmitted from the transmitting apparatus 20 by using retransmission control of the HARQ scheme, the receiving apparatus 10 including: the management unit 12 configured to manage the target error rate Pt in the target number of retransmissions Nt; the HARQ processing unit 14 configured to measure the initial transmission rate $TPUT_{init}$ of the data in the transmitting apparatus 20; and the calculation unit 15 configured to calculate the target value TPUT of the reception rate of the data in the receiving apparatus 10 by Equation 4.

$$TPUT = \frac{TPUT_{init}}{Nt + Pt + 1} \qquad \text{[Equation 4]}$$

In the first aspect of the present embodiment, the receiving apparatus 10 may further include: the inner-loop transmission power control unit 11 configured to control a transmission power of the transmitting apparatus 20 for the data on the basis of the target SIR (target reception quality); and the outer-loop transmission power control unit 13 configured to control the target SIR on the basis of the target error rate Pt in the target number of retransmissions Nt.

In the first aspect of the present embodiment, the receiving apparatus 10 may be provided in the radio base station NodeB in a case where the transmitting apparatus 20 is provided in the mobile station UE.

In the first aspect of the present embodiment, the receiving apparatus 10 may be provided in the radio network controller RNC in a case where the transmitting apparatus 20 is provided in the mobile station UE.

In the first aspect of the present embodiment, the receiving apparatus 10 may be provided in the mobile station UE in a case where the transmitting apparatus 20 is provided in the radio base station NodeB.

Note that operations of the above-described receiving apparatus 10 and transmitting apparatus 20 may be implemented by hardware or may be implemented by a software module to be executed by a processor, or may be implemented in combination of the both.

The software module may be provided in any type of storage medium such as a RAM (Random Access Memory), a flash memory, a ROM (Read Only Memory), an EPROM (Erasable Programmable ROM), an EEPROM (Electronically Erasable and Programmable ROM), a register, a hard disk drive, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the receiving apparatus 10 and the transmitting apparatus 20. Also, the storage medium and the processor may be provided in the receiving apparatus 10 and the transmitting apparatus 20 as a discrete component.

Hereinabove, the present invention has been described in detail using the above embodiment; however, it is apparent to those skilled in the art that the present invention is not limited to the embodiment described herein. Modifications and variations of the present invention can be made without departing from the scope of the present invention defined by the description of the scope of claims. Thus, what is described herein is for illustrative purpose, and has no intention whatsoever to limit the present invention.

Note that the entire content of Japanese Patent Application No. 2009-070565 (filed on Mar. 23, 2009) is incorporated herein by reference.

INDUSTRIAL APPLICABILITY

As described above, with the receiving apparatus according to the present invention, a target value of a reception rate of data can be appropriately calculated in a mobile communication system in which fast transmission power control and retransmission control of the HARQ scheme are performed in combination.

The invention claimed is:

1. A receiving apparatus configured to receive data transmitted from a transmitting apparatus by using retransmission control of a hybrid automatic repeat request scheme, the receiving apparatus comprising:
a management unit configured to manage a target error rate in a target number of retransmissions;
a measurement unit configured to measure an initial transmission rate of the data in the transmitting apparatus; and
a calculation unit configured to calculate a target value of a reception rate of the data in the receiving apparatus by Equation 1A, where Pt denotes the target error rate and is an error rate value within a range of zero to 1, Nt denotes the target number of retransmissions and is a finite number equal to or greater than zero, $TPUT_{init}$ denotes the initial transmission rate of the data in the transmitting apparatus and is a positive, non-zero, finite throughput rate measured as packets transmitted per unit of time, and TPUT denotes the target value of a reception rate of the data in the receiving apparatus and is a positive, non-zero, finite throughput rate measured as packets transmitted per unit of time, $$TPUT = \frac{TPUT_{init}}{Nt + Pt + 1}. \qquad \text{[Equation 1A]}$$

2. The receiving apparatus according to claim 1 further comprising:
an inner-loop transmission power control unit configured to control a transmission power of the transmitting apparatus for the data on the basis of a target reception quality; and
an outer-loop transmission power control unit configured to control the target reception quality on the basis of the target error rate Pt in the target number of retransmissions Nt.

3. The receiving apparatus according to any one of claims 1 and 2, wherein the receiving apparatus is provided in a radio base station in a case where the transmitting apparatus is provided in a mobile station.

4. The receiving apparatus according to any one of claims 1 and 2, wherein the receiving apparatus is provided in a radio network controller in a case where the transmitting apparatus is provided in a mobile station.

5. The receiving apparatus according to any one of claims 1 and 2, wherein the receiving apparatus is provided in a mobile station in a case where the transmitting apparatus is provided in a radio base station.

6. A method, implemented on a receiving apparatus configured to receive data transmitted from a transmitting apparatus by using retransmission control of a hybrid automatic repeat request scheme, the method comprising:
managing a target error rate in a target number of retransmissions;
measuring an initial transmission rate of the data in the transmitting apparatus; and
calculating, by a processor, a target value of a reception rate of the data in the receiving apparatus by Equation 1A, where Pt denotes the target error rate and is an error rate value within a range of zero to 1, Nt denotes the target number of retransmissions and is a finite number equal to or greater than zero, $TPUT_{init}$ denotes the initial transmission rate of the data in the transmitting apparatus and is a positive, non-zero, finite throughput rate measured as packets transmitted per unit of time, and TPUT denotes the target value of a reception rate of the data in the receiving apparatus and is a positive, non-zero, finite throughput rate measured as packets transmitted per unit of time, $$TPUT = \frac{TPUT_{init}}{Nt + Pt + 1}.$$ [Equation 1A]

7. A receiving apparatus configured to receive data transmitted from a transmitting apparatus by using retransmission control of a hybrid automatic repeat request scheme, the receiving apparatus comprising:
  circuitry configured to:
    manage a target error rate in a target number of retransmissions;
    measure an initial transmission rate of the data in the transmitting apparatus; and
    calculate a target value of a reception rate of the data in the receiving apparatus by Equation 1A, where Pt denotes the target error rate and is an error rate value within a range of zero to 1, Nt denotes the target number of retransmissions and is a finite number equal to or greater than zero, $TPUT_{init}$ denotes the initial transmission rate of the data in the transmitting apparatus and is a positive, non-zero, finite throughput rate measured as packets transmitted per unit of time, and TPUT denotes the target value of a reception rate of the data in the receiving apparatus and is a positive, non-zero, finite throughput rate measured as packets transmitted per unit of time, $$TPUT = \frac{TPUT_{init}}{Nt + Pt + 1}$$ [Equation 4]

* * * * *